United States Patent
Loew

(10) Patent No.: US 7,444,020 B2
(45) Date of Patent: Oct. 28, 2008

(54) REDUCTION OF ROUNDING ERRORS DURING THE PROCESSING OF DIGITAL IMAGE DATA

(75) Inventor: Andreas Loew, Gross-Gerau (DE)

(73) Assignee: Thomson Licensing, Boulogne-Billancourt (FR)

( * ) Notice: Subject to any disclaimer, the term of this patent is extended or adjusted under 35 U.S.C. 154(b) by 961 days.

(21) Appl. No.: 10/879,451

(22) Filed: Jun. 29, 2004

(65) Prior Publication Data

US 2005/0036678 A1  Feb. 17, 2005

(30) Foreign Application Priority Data

Jul. 1, 2003  (DE)  ............... 103 29 608

(51) Int. Cl.
*G06K 9/00*  (2006.01)
(52) U.S. Cl. ............... 382/181; 382/218; 348/263
(58) Field of Classification Search .......... 382/181, 382/218; 348/263
See application file for complete search history.

(56) References Cited

U.S. PATENT DOCUMENTS

| 4,729,035 | A | * | 3/1988 | Tanioka ............ 382/237 |
| 4,758,889 | A |   | 7/1988 | Keesen et al. |
| 5,194,945 | A | * | 3/1993 | Kadowaki et al. ........ 358/520 |
| 5,379,236 | A | * | 1/1995 | Yamamoto ............ 348/172 |
| 5,485,203 | A | * | 1/1996 | Nakamura et al. ........ 348/263 |
| 2001/0024292 | A1 |   | 9/2001 | Denk et al. |

FOREIGN PATENT DOCUMENTS

| DE | 3608914 A1 | 3/1986 |
| EP | 0237928 B1 | 3/1998 |
| WO | WO 97/01153 | 1/1997 |

OTHER PUBLICATIONS

German Search Report filed Sep. 20, 2005.

* cited by examiner

*Primary Examiner*—Matthew C Bella
*Assistant Examiner*—John B Strege
(74) *Attorney, Agent, or Firm*—Joseph J. Laks; Paul P. Kiel; Joseph J. Opalach

(57) ABSTRACT

In order to avoid rounding errors as a result of restricted accuracy of the processing unit in a video processing arrangement, a comparison is carried out between processed image data and unprocessed image data. For this purpose, the unprocessed image data is buffer-stored in a memory and is supplied together with the processed image data to a comparator, which compares the difference between the processed image data and the unprocessed image data with a threshold value. Either the processed image data or the unprocessed image data is produced at the output of the arrangement, by means of a multiplexer, as a function of the result of the comparison. A rounding element between the processing unit and the multiplexer rounds the processed image data before it is emitted, if the processing stage has not itself carried out a rounding process.

13 Claims, 4 Drawing Sheets

REDUCTION OF ROUNDING ERRORS DURING THE PROCESSING OF DIGITAL IMAGE DATA

This application claims the benefit, under 35 U.S.C. §119 of German Patent Application 10329608.5, filed Jul. 1, 2003.

FIELD OF THE INVENTION

The invention relates to an arrangement and to a method for processing digital image data.

BACKGROUND OF THE INVENTION

Digital image data is data which in general describes images that are composed of pixels arranged in rows and/or columns, and whose totality results in the representation of an image. The individual pixels may in this case be described in various ways, for example broken down into components as color triples in the primary colors red, green and blue, as brightness and color difference signals Y, Cr, Cb. The image data is in this case represented by binary numerical values, so-called data words, with a specific number of digits, or word or bit length.

During the post-processing of digital image data, for example in order to correct the color values, the brightness or the contrast, the individual pixels and a correction value, which can in each case be adjusted by an operator, are supplied to a processing unit. The processing unit produces an output value at its output. Normally, both the image data and the correction value are supplied to the processing unit in binary form. In this case, the pixels and the correction values are represented by data words of a specific length, bit length or word length. Depending on the nature of the processing in the processing unit, the result of the processing, that is to say the output value, may have a greater data word bit length than each individual one of the supplied data words for the pixel value and correction value. Binary multiplication of natural numbers, in particular, results in data words with a word length which corresponds to the sum of the word lengths of the multiplicand and the multiplier. If two or more processing units are intended to be connected in series, then the word length that is required rises considerably with each processing unit. However, it is normal to connect a number of processing units in series. For example, color saturation is corrected first of all, after which the brightness is adapted. If now, for example, pixels with a word length of 32 bits and correction values with a word length of 16 bits are linked in a multiplication operation, then the resultant output value has a word length of 48 bits. If this value is processed in a further processing operation with a correction value which likewise has a word length of 16 bits, then the results of the second processing operation in fact has a word length of 64 bits. The above example shows very quickly that even a small number of processing operations carried out in series results in very great word lengths.

Nowadays, the operations carried out in professional video processing are carried out by means of logic circuits which have hardware gates in order to allow processing in real time. Real-time processing offers the user the advantage that the changes carried out by him can be seen directly on a monitor. However, it is very complex and costly to design processing units with very great word lengths. In order to keep the complexity within tolerable limits, the results are thus rounded to the word length of the input word after each processing stage. The rounding process is frequently carried out by appropriate omission of the least significant bit (LSB).

Modern video processing devices often have a number of series-connected processing units, between which the signal or the image data cannot be tapped off and which also cannot be bypassed. A situation often arises in which only one specific correction is intended to be carried out, for example the correction of a specific color value or of a specific component of a pixel, while no other corrections should be carried out. However, the image data for all of the pixels is passed through the video processing unit. In this case, the result of the processing, for example for a color value which is intended to remain unprocessed, differs from the input value as a result of the restricted computation accuracy of the processing unit, although this is also only insignificant. However, the signal is corrupted despite the only insignificant change between the output value and the input value. One object of the invention is to propose an arrangement and a method for reducing processing errors during the processing of digital image data.

SUMMARY OF THE INVENTION

This object is achieved by an arrangement as claimed in claim 1, and by a method as claimed in claim 10. Advantageous developments and refinements of the invention are described in the dependent claims.

The arrangement according to the invention has an image data input and a control input, which are supplied to a processing stage. The image data and the control data are linked in the processing stage, and the result of the logic operation is passed to an output. Furthermore, the image data supplied to the processing stage is buffer-stored. The result of the processing is compared with the buffer-stored, unprocessed image data. This may be done, for example, by subtraction, with the result of the subtraction then being compared with a variable threshold value. If the result of the subtraction is less than the variable threshold value, a multiplexer is driven such that the buffer-stored image data is passed to the output of the arrangement for processing digital image data. Otherwise, the processed image data is passed to the output of the arrangement. In order to prevent the word length from increasing with each processing stage, the result of the processing stage is passed via a rounding element before it is applied to the multiplexer. This ensures that the image data is not corrupted as a result of internal inaccuracies in the processing stages, when no processing is intended, or when the processing for specific pixels has no effect, other than rounding errors.

In one development of the arrangement according to the invention, image data for pixels which have been broken down into component elements is processed in parallel. A corresponding number of processing stages are provided for this purpose. Each of the parallel processing stages is designed as described above, that is to say there is a processing unit, a memory and a rounding element for each component element. The decision as to whether the stored values or the processed values should be passed to the output is made after carrying out a logic AND operation on the comparison results for each component element. If the differences between the processed image data and the stored image data for all the component elements is below the threshold values, the processed values are passed to the output, otherwise the stored values are passed to the output. A corresponding multiplexer is provided for this purpose, which has a number of inputs and outputs corresponding to the number of component elements. The stored image data as well as the processed and subsequently rounded image data of the component elements are supplied in a corresponding manner to the inputs of the multiplexer.

In yet another development of the arrangement according to the invention, image data that has been broken down into component elements is processed at least partially in serial form. To do this, a multiplexer in each case selects image data for the component elements which are stored in a memory and supplies this data to the processing stage. The actual processing is carried out as described further above. The unprocessed value and the processed value are each supplied to a comparator, which compares the difference between the two values with a variable threshold value. The processed value is also written via a rounding element and a multiplexer to appropriate memory locations in a memory. The results of the comparison operations for the image data of the component elements are likewise written via a multiplexer to appropriate memory locations in a memory. Once all of the image data for the component elements for a pixel has been processed, a further multiplexer is driven by a logic AND gate such that either the unprocessed image data or the processed image data for the component elements of the image signal is produced at the output. This is done by supplying the stored comparison results to the logic AND gate. The logic AND gate is expediently supplied with a clock signal, which does not allow switching until the processing of all the component elements for an image signal has been completed. This variant of the arrangement makes it possible to reduce the number of function blocks that have to be provided in parallel. The processing clock rate of the function blocks must be increased appropriately for the number of component elements, for this purpose.

For the two further developments described last, it is feasible to design the comparison unit and the multiplexer such that a decision is made individually for each component element of the image data, via the application of the processed value or the stored value.

In general, an individual threshold value may also be provided for each individual one of the component elements.

In principle, it is also feasible to carry out the rounding process on the processed image data value before the comparator.

BRIEF DESCRIPTION OF THE DRAWINGS

The invention will be described in the following text with reference to the drawing, in which.

Identical or similar elements are provided with the same reference symbols in the figures.

DETAILED DESCRIPTION OF PREFERRED EMBODIMENTS

Figure 1:
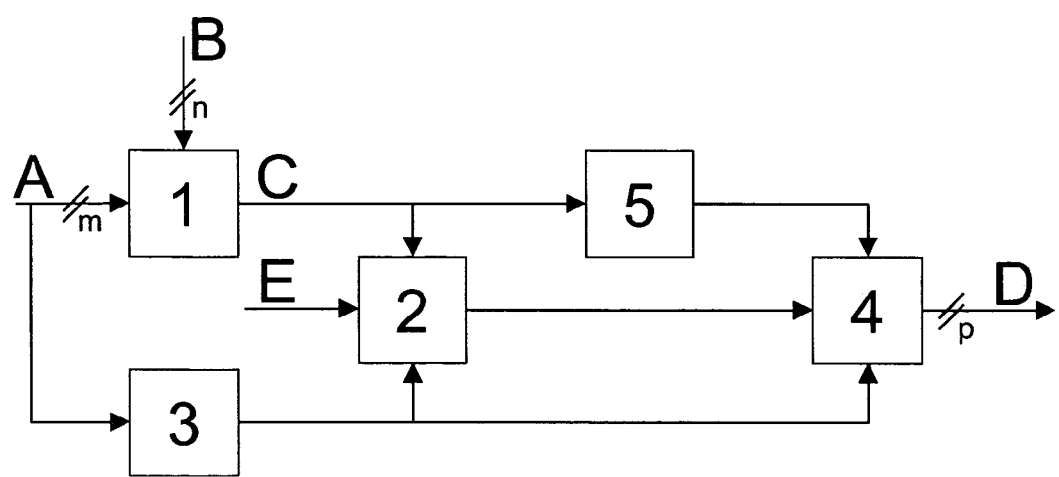
FIG. 1 shows a general block diagram of the arrangement according to the invention.

FIG. 1 shows a block diagram of the arrangement according to the invention. In the figure, a signal A with a word length m is passed to a processing stage 1. This may, for example, be a gamma multiplier. The signal A is also passed to a memory 3, in which it is buffered during the processing time of the processing stage 1. The processing stage is supplied with one or more actuating signals. It would be possible, for example, to convert the signal from the time domain to the frequency domain (FFT) in the processing stage, with specific frequencies being processed in the frequency domain as a function of the parameters, and then being converted back to the time domain. Rounding processes are carried out at the output, or else even during the processing. A signal C which is produced at the output once again has the same word length m as the signal A. In this simple example, only one actuating signal B, with a word length n, is supplied. The processing stage converts the signal to a logarithmic form by the use of a mapping table. It is then multiplied by the actuating signal B, after which it is converted back to the linear representation by means of a second mapping table. Rounding is required in particular before the second mapping table, in order to keep the size of the table within acceptable limits (for example m=16, first mapping table size 64K*18 bits with an 18-bit output, n=16, thus resulting after multiplication in a bit length of 18+n=34, which would require a table whose size is $17 \times 10^9 \times 16$ bits). The signal C, whose word length is once again m, is produced at the output of the processing stage 1. The signal A is passed to a comparator 2 via the memory 3, and the signal C is passed to the comparator 2 directly, and the comparator 2 compares the difference between the two signals A and C with a reference value E. The comparator 2 may, for example, be formed from a subtractor and a comparator. The output signal from the comparator drives a multiplexer 4, to which the signal A is applied via the memory 3, and the signal C is applied. The unchanged signal A is produced at the output D of the multiplexer 4 if the difference between the processed signal and the unprocessed signal is less than the reference value E. Otherwise, the processed signal is produced at the output D. If no suitable rounding has been carried out in the processing stage itself, a rounding element 5 may be provided between the output of the processing stage 1 and the multiplexer 4, and preferably produces at its output data words whose word length corresponds to the word length m of the input signal.

Figure 2:
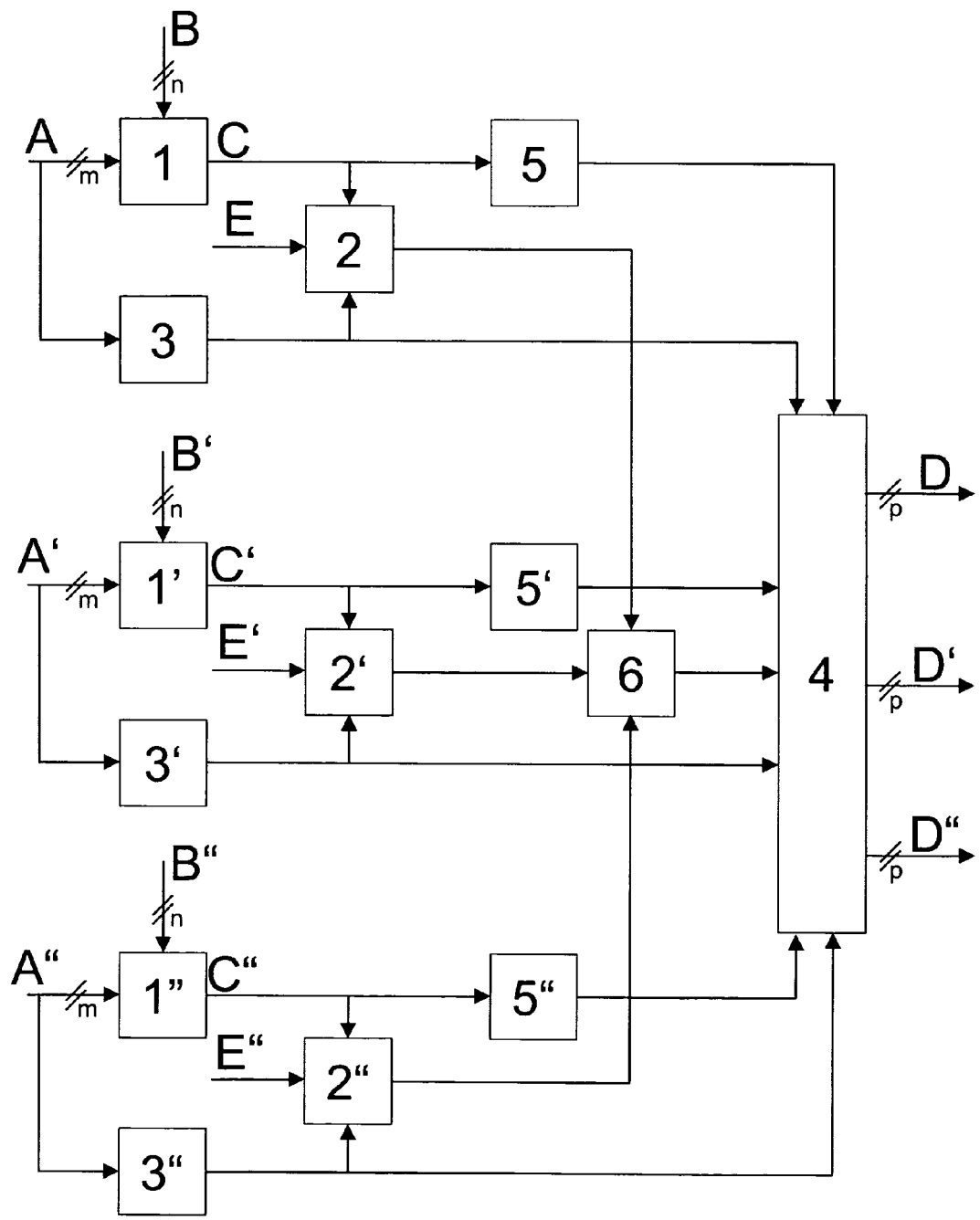
FIG. 2 shows a block diagram of an arrangement according to the invention for parallel processing.

FIG. 2 shows a block diagram of an arrangement according to the invention for parallel processing of digital image data which has been broken down into component elements.

The figure essentially shows the arrangement as shown in FIG. 1 in a triplicated form. The elements that are provided for each of the component elements are provided with the same reference symbols in the figure and are annotated by a single prime character or a double prime character in order to distinguish between them. The signal A in the figure is subdivided into the component elements A, A' and A". The route of the signal components corresponds to the route of the signal A from the description relating to FIG. 1. The signals A, A', A" are converted in processing stages 1, 1' and 1" to output signals C, C', C", and are then supplied to the comparators. In a further refinement of the invention, the processing stages 1, 1' and 1" may be combined in a single processing stage. In this case, the single components A, A' and A" as well as the actuating signals B, B' and B" are passed to appropriate inputs, and the signals C, C' and C" are produced at appropriate outputs. In contrast to FIG. 1, the results from the comparators 2, 2' and 2" are first of all passed to a logic AND gate 6, whose output drives the multiplexer 4. This ensures that the unprocessed signal is not passed to the output unless the reference values E, E' and E" are undershot for all of the differences between the signal components A, A' and A" and the signals C, C' and C". The selection process is accordingly carried out by means of a triple 1-from-2 multiplexer 4. In yet another refinement of the invention, the logic AND gate 6 is omitted. In this case, an individual decision is made for each component element as to whether the processed signal or the unprocessed signal will be passed to the output. The multiplexer 4 is in this case designed such that the processed or unprocessed signal can be selected individually for each component element.

Figure 3:
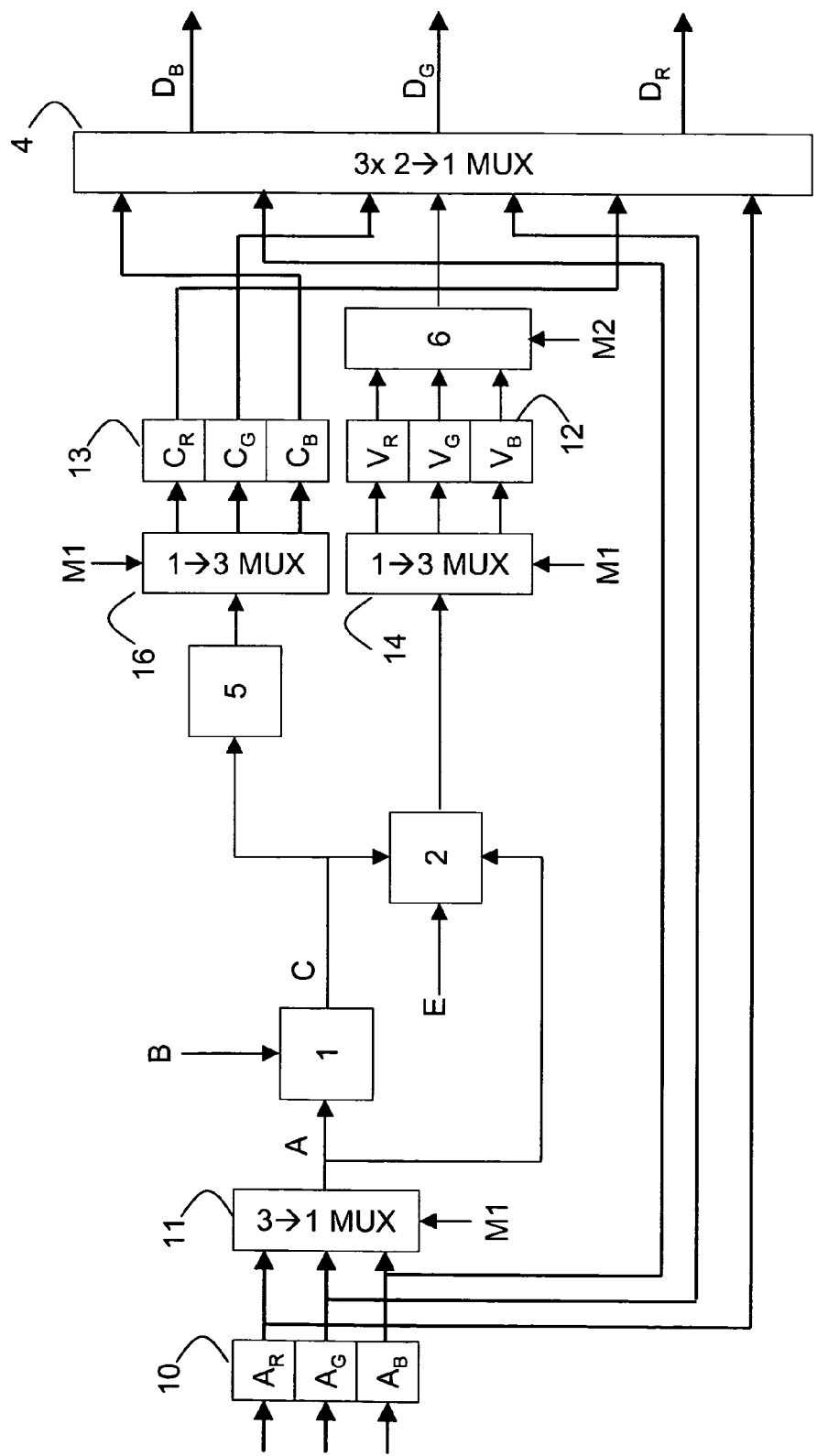
FIG. 3 shows a block diagram of an arrangement according to the invention, with the image signal being processed partially in serial form.

FIG. 3 shows a block diagram of an arrangement according to the invention with the image data being partially processed in serial form. By way of example, the component elements of the image signal in the figure are represented by the primary colors red, green and blue, and are identified by the indices R, G and B to represent this. The data values $A_R$, $A_G$ and $A_B$ of the component elements are first of all passed to a memory 10. A multiplexer 11 successively selects the component elements in the memory, and passes these as the input signal A to a processing stage 1. The processing stage 1 is also supplied with a control signal B. The processed signal element C is passed to a comparator 2, in the same way as the unprocessed signal element A, which is still selected by the multiplexer. The comparator 2 compares the difference between the signals A and C with the reference value E. The results $V_R$, $V_G$ and $V_B$ of the comparison operation are stored, via a multiplexer 14, at memory locations that are associated with the component elements in a memory 12. The data in the processed signal elements $C_R$, $C_G$ and $C_B$ is also passed via a rounding element 5 and a multiplexer 16 to corresponding memory locations in a memory 13. Once all of the component elements that are associated with one pixel have been processed, a multiplexer 4 is switched by an AND gate 6 as a function of a logic AND operation on the stored comparison results $V_R$, $V_G$ and $V_B$ such that either the processed image data $C_R$, $C_G$ and $C_B$ from the memory 13, or the unprocessed image data $A_R$, $A_G$ and $A_B$ from the memory 10 is produced at the outputs $D_R$, $D_G$ and $D_B$ of the multiplexer. In order to ensure real-time processing, the multiplexers 11, 14 and 16 as well as the entire processing unit must be driven at a clock rate which is higher than the clock rate of the image data and pixels. In one development of the invention, the AND gate which links the results of the comparison operations on the component elements is advantageously driven such that the multiplexer 4 is not driven unless all the result elements are available. In another exemplary embodiment of the invention, the multiplexer 4 has an output memory, which in each case maintains the most recently valid selected values, and produces these values at the outputs until another valid selection is made.

Figure 4:
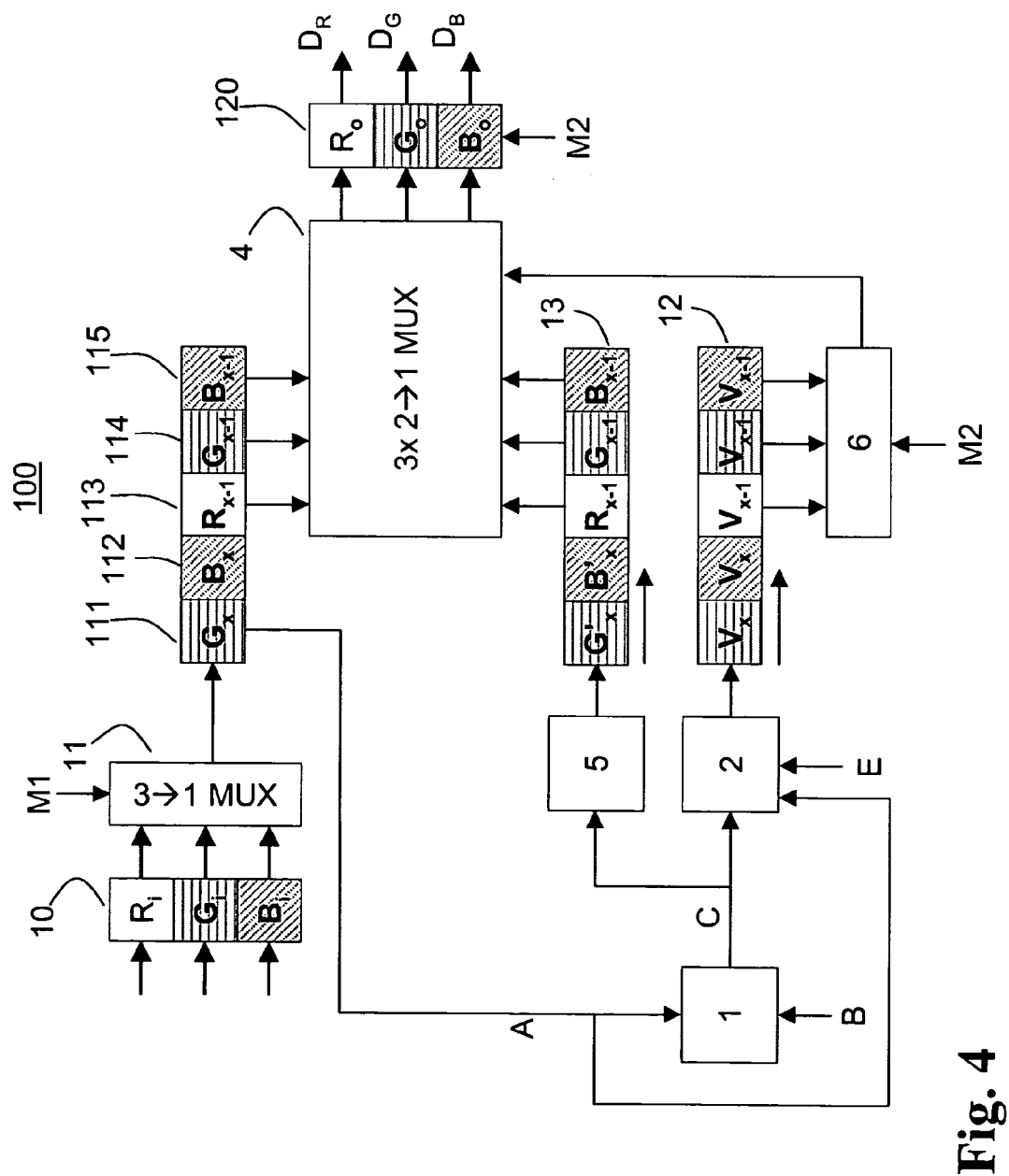
FIG. 4 shows a further example of an arrangement according to the invention, for processing the image signal partially in serial form.

FIG. 4 shows a further example of an arrangement according to the invention for partially processing the image signal in serial form. In the figure, a signal which has been broken down into component elements $A_R$, $A_G$ and $A_B$ is passed via a memory 10 to a multiplexer 11. The multiplexer 11 passes the image data for the component elements from the memory 10 to a shift register 100. The shift register 100 comprises the memory cells 111-115. During each clock cycle, a data value which has been shifted from the left into the shift register 100 in the figure is shifted by one memory location to the right, with the most recent data value in each case being shifted out of the shift register 100 to the right. The value which is written to the first memory location 111 in the shift register 100 is passed as the signal A to a processing stage 1, and to a comparator 2. An actuating value $_B$ is likewise passed to the processing stage 1. The signal C is produced at the output of the processing stage 1, and is supplied to the comparator 2 and to a rounding element 5. The comparator compares the difference between the signals A and C with the threshold value E. The rounding element 5 is connected to a shift register 13, which receives the rounded image data from the rounding element. During each clock cycle, the image data is shifted by one memory location to the right in the shift register 13. The last three memory locations in the shift registers 13 and 100 are each connected to a triplicated 1-from-2 multiplexer 4. The number of memory locations which are connected to the multiplexer 4 varies as a function of the selected way in which the image data is subdivided into component elements. The output of the multiplexer 4 is connected to a memory 120, which stores the component elements of the image data. The memory 120 also represents the output of the arrangement. The results of the comparison of the processed image data and of the unprocessed image data by the comparator 2 are stored together with the variable threshold value E in a shift register 12. The last three memory locations in the shift register 12 are connected to a logic AND gate 6. The statements that have been made above with regard to the memories 13 and 100 also apply to the shift register 12, with the number of memory locations which are connected to the logic AND gate 6 being varied as a function of the number of component elements of the image signal. The output of the logic AND gate 6 drives the multiplexer 4 in the same way as stated in the descriptions relating to FIGS. 1 to 3. The number of memory locations in the shift registers 12, 13 and 100 also depends on the number of operating clock cycles which the processing stage 1 requires to carry out the respective operation. A processing time of one clock cycle has been assumed in the figure. An appropriate design ensures that both the unprocessed image data and the processed image data are produced in some suitable manner at the multiplexer 4, and that the associated results of the comparison of the processed image data and unprocessed image data are passed to the logic AND gate 6 suitably associated in time, and drive the multiplexer 4.

What is claimed is:

1. An arrangement for processing digital image data, having an image data input with the word length m and a control input with the word length n, which image and control data are supplied to a processing stage which emits the processed image data at an output, and having an image data output with a word length of p, wherein a comparator is provided, to which the image data input is connected via a memory and the output of the processing stage is connected, wherein the comparator compares the difference between the processed image data and the stored image data with a comparison value, and drives a multiplexer as a function of the result of the comparison, to whose inputs the processed image data and the stored image data are applied, and whose output is connected to the image data output.

2. The arrangement as claimed in claim 1, wherein the stored image data is produced at the output of the multiplexer if the difference between the stored image data and the processed image data is less than the comparison value.

3. The arrangement as claimed in claim 1 wherein a rounding element is provided between the output of the processing stage and the input of the multiplexer, and the word length p of the image data output is less than the sum of the word lengths m and n.

4. The arrangement as claimed in claim 1, wherein the memory emits the image data, delayed essentially by the delay time of the processing stage.

5. The arrangement as claimed in claim 1, wherein the image data can be processed broken down into its component elements, and those results of the comparison of the processed image data and unprocessed image data which are associated with the component elements are passed to the multiplexer, wherein the multiplexer has a number of outputs and selectable inputs corresponding to the number of component elements.

6. The arrangement as claimed in claim 5, wherein the results of the comparison are passed via a logic AND gate to the multiplexer, and the multiplexer selects a number of inputs in parallel corresponding to the number of component elements.

7. The arrangement as claimed in claim 5, wherein a number of processing stages, comparators and memories corresponding to the number of component elements are provided, for parallel processing of the component elements.

8. The arrangement as claimed in claim 7, wherein a number of inputs and outputs of a common processing stage are provided, corresponding to the number of component elements.

9. The arrangement as claimed in claim 5, wherein the component elements of the image data are passed via a multiplexer to the processing stage and to the comparator, and memories are provided for storing the processed component elements and the results of the comparisons.

10. A method for processing digital image data, which image data is supplied together with a control variable to a processing stage and is produced at an output, wherein the method comprises the following further steps:

a) buffer-storage of the supplied image data before processing;

b) comparison of the buffer-stored image data with the respectively associated processed image data;

c) selection of the buffer-stored image data or of the processed image data for outputting, as a function of the result of the comparison in step b).

11. The method as claimed in claim 10, wherein, in order to select the buffer-stored image data or the processed image data, the difference from the respective image data is formed, and the result is compared with a comparison value.

12. The method as claimed in claim 11, wherein the buffer-stored image data is emitted if the difference is less than the comparison value, and wherein the processed image data is emitted if the difference is greater than the comparison value.

13. The method as claimed in claim 10 wherein the processed image data is rounded before being emitted.

* * * * *